(12) United States Patent
Tiirola et al.

(10) Patent No.: US 7,656,967 B2
(45) Date of Patent: ***Feb. 2, 2010

(54) INTERFERENCE POWER ESTIMATION FOR ADAPTIVE ANTENNA SYSTEM

(75) Inventors: Esa Tiirola, Oulu (FI); Kari Pajukoski, Oulu (FI)

(73) Assignee: Nokia Corporation, Espoo (FI)

( * ) Notice: Subject to any disclaimer, the term of this patent is extended or adjusted under 35 U.S.C. 154(b) by 437 days.

This patent is subject to a terminal disclaimer.

(21) Appl. No.: 10/465,992

(22) PCT Filed: Dec. 20, 2001

(86) PCT No.: PCT/EP01/15155

§ 371 (c)(1), (2), (4) Date: Nov. 21, 2003

(87) PCT Pub. No.: WO02/054638

PCT Pub. Date: Jul. 11, 2002

(65) Prior Publication Data

US 2004/0076132 A1    Apr. 22, 2004

(30) Foreign Application Priority Data

Dec. 29, 2000  (GB) ................... 0031841.0

(51) Int. Cl.
*H04L 27/00* (2006.01)
(52) U.S. Cl. .................. 375/316; 375/140
(58) Field of Classification Search ............ 375/316, 375/130, 140, 324
See application file for complete search history.

(56) References Cited

U.S. PATENT DOCUMENTS

| 5,933,421 | A | * | 8/1999 | Alamouti et al. | 370/330 |
| 6,108,565 | A | | 8/2000 | Scherzer | |
| 6,192,066 | B1 | | 2/2001 | Asanuma | |
| 6,430,166 | B1 | * | 8/2002 | Bejjani et al. | 370/320 |
| 6,470,177 | B1 | * | 10/2002 | Andersson et al. | 455/91 |
| 6,473,451 | B1 | * | 10/2002 | Seki et al. | 375/142 |
| 6,754,473 | B1 | * | 6/2004 | Choi et al. | 455/101 |

(Continued)

FOREIGN PATENT DOCUMENTS

EP    0 952 682 A2    10/1999

(Continued)

OTHER PUBLICATIONS

Universal Mobile Telecommunications System (UMTS); Physical channels and mapping of transport channels onto physical channels (FDD) (3GPP TS 25.211 version 3.4.0 Release 1999), ETSI TS 125 211 V3.4.0 Sep. 2000, XP 002185178, retrieved from the Internet: http://pda.etsi.org/pda/queryform.asp, retrieved on Dec. 10, 2001.

(Continued)

*Primary Examiner*—Chieh M. Fan
*Assistant Examiner*—Freshteh N Aghdam
(74) *Attorney, Agent, or Firm*—Squire, Sanders & Dempsey, L.L.P.

(57) ABSTRACT

There is proposed a technique for determining an estimate of interference power, in the receiver of a communication system utilizing adaptive antenna techniques. The technique uses information transmitted in the antenna signals and in the beam signals to determine the estimate of the interference power.

27 Claims, 3 Drawing Sheets

U.S. PATENT DOCUMENTS

| | | | |
|---|---|---|---|
| 6,914,932 B1* | 7/2005 | Miya et al. | 375/150 |
| 2002/0137548 A1* | 9/2002 | Miya | 455/562 |

FOREIGN PATENT DOCUMENTS

| | | |
|---|---|---|
| EP | 0 977 371 A2 | 2/2000 |
| JP | 11-252002 | 9/1999 |
| WO | WO 00/51389 | 8/2000 |

OTHER PUBLICATIONS

Ericsson, TSGR4#13(00)0754, "Performance Requirement for Demodulation of Dedicated Pilot in R00," Sep. 4-8, 2000, Turin, Italy, pp. 1-3.

Usuda et al., "Optimizing the Number of Dedicated Pilot Symbols for Forward Link in W-CDMA Systems," 2000, VTC-Spring, pp. 2118-2122, Tokyo, Japan.

Sipila et al., "Modeling the Impact of the Fast Power Control on the WCDMA Uplink," 1999, IEEE, Vehicular Technology Conference, vol. 2, pp. 1266-1270, Houston, Texas.

3GPP Ts 25.211, v. 3.4.0, Release 1999, "Universal Mobile Telecommunications System (UMTS); Physical Channels and Mapping of Transport Channels onto Physical Channels (FDD)," Sep. 2000, pp. 1-43.

Pederson, "Antenna Arrays in Mobile Communications, Channel Modeling and Receiver Design for DS-CDMA Systems," Ph.D. Thesis, Jan. 2000, Aalborg University, Denmark, pp. 1-118, Plus Appendices A-J.

Holma et al., "WCDMA for UMTS," John Wiley & Son Inc., 2000.

Proakis, "Digital Communications," Third Edition, McGraw Hill, New York, 1995.

Kay, "Fundamentals of Statistical Signal Processing - Estimation Theory," Prentice Hall International, New Jersey, 1993.

* cited by examiner

INTERFERENCE POWER ESTIMATION FOR ADAPTIVE ANTENNA SYSTEM

FIELD OF THE INVENTION

The present invention relates to a technique for estimating interference power in the receiver of an adaptive antenna system, and particularly but not exclusively for fast power control purposes in a mobile station receiver in a mobile communication system.

BACKGROUND TO THE INVENTION

In wide-band code division multiple access (W-CDMA) systems, precise power control is one of the basic requirements for high system capacity. Transmit powers in the downlink should be kept as low as possible in order to minimise interference, but high enough to ensure the required quality of service. Furthermore, in the downlink, it is desirable to provide a marginal amount of additional power to mobile stations at the cell edge, as they suffer from increased other-cell interference.

Even though a relatively slow power control algorithm is able to compensate for large-scale attenuation, distance attenuation and shadow fading, a fast power control algorithm is needed for multi-path fading for slowly moving mobiles.

In the forward link, i.e. the down-link, of a wide-band code division multiple access (WCDMA) system, the inner-loop power control adjusts the base-station transmit power in order to keep the received down-link signal-to-interference ratio (SIR) at a given target level (at the mobile station). The SIR target is defined according to the quality requirements. For reliable SIR estimation, narrowband estimation (after despreading) has to be employed. This is important especially in the down-link direction of the W-CDMA system because of the usage of orthogonal channelization codes. Tight delay requirements of the power control demand that the SIR estimation has to be obtained on a slot-by-slot basis.

The SIR estimation is divided into: a) signal power estimation; and b) interference power estimation.

In the forward link of a wide-band code division multiple access (WCDMA) system, a primary common pilot channel (P-CPICH) is broadcast over the entire cell or a sector. The P-CPICH is broadcast also in the case of a multi-beam arrangement (multiple beams per sector) and in the user specific beamforming. Therefore there always exists one such channel per sector regardless of the applied transmission scheme.

In the case of single antenna transmission, the interference power estimation is currently performed based on the primary common pilot channel. However, when utilising adaptive antenna techniques the dedicated channels are usually transmitted through a narrow beam, which means that the P-CPICH and down-link physical channels (DL-DPCH) experience different channel characteristics in transmission to the mobile station antenna. Due to that the fading of DL-DPCH can be almost uncorrelated compared to that of P-CPICH. The correlation depends on the angular spread of the radio channel (seen from the base transceiver station).

In current known systems, the down-link dedicated physical control channel (DL-DPCCH) is used for power interference estimation for the DL-DPCH (beam signal) in adaptive antenna systems because of the fact that the P-CPICH (antenna signal) does not usually experience the same channel characteristics on transmission to a mobile station antenna.

It is an aim of the present invention to provide an improved technique for estimating interference power in the receiver of an adaptive antenna system.

SUMMARY OF THE INVENTION

In accordance with one aspect of the present invention there is provided a method of estimating the interference power in a receiver of a communication system having an adaptive antenna transmitter comprising: receiving a beam signal; receiving an antenna signal; and estimating the interference power of the received beam signal based on information received in the received antenna signal.

The antenna signal, in this context, is the signal that is broadcast for many users commonly (transmitted over the entire sector) whereas the beam signal is a user specific transmission (a group of users—specific transmission in the case of multi-beam system). It is also possible to generate the antenna signal by transmitting it from all the elements of the antenna array. The beam signal is generally transmitted over a part of the sector. In the case of adaptive antenna transmission schemes, the so-called antenna and beam signals can experience different channel characteristics on transmission to a mobile station antenna. The step of estimating the interference power may be further based on the received beam signal. The antenna signal may include a common pilot channel, the step of estimating interference power being based on signals received in the common pilot channel. The beam signal may include a dedicated channel, the step of estimating interference power being further based on signals received in the dedicated channel. The communication system may be a W-CDMA system. The antenna signal may include a primary common pilot channel. The beam signal may include a secondary common pilot channel. The step of estimating interference power may utilise pilot signals transmitted in the primary common pilot channel. The step of estimating interference power may utilise pilot signals transmitted in the secondary common pilot channel. The beam signal may include a dedicated physical channel. The step of estimating interference power may utilise pilot signals transmitted in the dedicated physical channel. The interference power may be estimated using equal gain combining.

The interference power may be estimated using:

$$\hat{h}_l^{(c)} = \frac{1}{N_c} \sum_{i=1}^{N_c} r_{l,i}^{(c)} a_i^{(c)*}$$

$$\hat{I} = \frac{1}{L} \sum_{l=1}^{L} \frac{1}{N_c} \sum_{i=1}^{N_c} \left| r_{l,i}^{(c)} - \hat{h}_l^{(c)} \right|^2$$

where:

$\hat{h}_l^{(c)}$=Channel estimate of P-CPICH channel, l is path index $N_c$=Number of pilot symbols per time slot in P-CPICH channel $a_i^{(c)}$=Complex pilot symbol of P-CPICH channel, i is symbol index $r_{l,i}^{(c)}$=Received complex pilot symbol from P-CPICH channel The interference power may be estimated using maximal ratio combining.

The interference power may be estimated using:

$$\hat{h}_l^{(d)} = \frac{1}{N_d} \sum_{i=1}^{N_d} r_{l,i}^{(d)} a_i^{(d)*}$$

$$\hat{I} = \sum_{l=1}^{L} \left[ |\hat{h}_l^{(d)}|^2 \frac{1}{N_c} \sum_{i=1}^{N_c} \left| r_{l,i}^{(c)} - \hat{h}_l^{(c)} \right|^2 \right]$$

Where:
$\hat{h}_l^{(d)}$=Channel estimate of DL-DPCCH channel, l is path index
$N_d$=Number of dedicated pilot symbols in timeslot
$a_i^{(d)}$=Dedicated complex pilot symbol, i is symbol index
$r_{i,l}^{(d)}$=Received complex pilot symbol from dedicated channel The invention further provides a method of estimating interference power in a receiver of a W-CDMA communication system having an adaptive antenna transmitter comprising: receiving a beam signal having a dedicated physical control channel; receiving an antenna signal having a primary common pilot channel; and estimating interference power on the received beam signal based on pilot signals received in the primary common pilot channel.

The interference power estimation may be additionally based on dedicated symbols received in the dedicated physical channel. The interference power estimation may be additionally based on pilot signals received in the secondary common pilot channel. In accordance with a further aspect of the present invention there is provided a receiver of a communication system having an adaptive antenna transmitter comprising: first input means for receiving a beam signal; second input means for receiving an antenna signal; and estimating means, connected to the second input means, for estimating the interference power of the received beam signal based on information received in the antenna signal.

The estimating means may be further connected to the first input means, for estimating the parameters based on information additionally received in the beam signal. The antenna signal may include a common pilot channel, the information being received in the common pilot channel. The beam signal may include a dedicated channel, the information being additionally received in the dedicated channel. A W-CDMA system may include such a receiver. A W-CDMA system may include at least one mobile station including such a receiver. The antenna signal may include a primary common pilot channel. The beam signal may include a secondary common pilot channel. The estimation of the interference power may utilise pilot signals transmitted in the primary common pilot channel. The estimation of the interference power may utilise pilot signals transmitted in the secondary common pilot channel. The beam signal may include a dedicated physical channel. The estimation of interference power may utilise signals transmitted in the dedicated physical channel.

BRIEF DESCRIPTION OF THE FIGURES

The invention will be best understood by way of example with reference to the following Figures in which.

DESCRIPTION OF THE PREFERRED
EMBODIMENT

Figure 1:
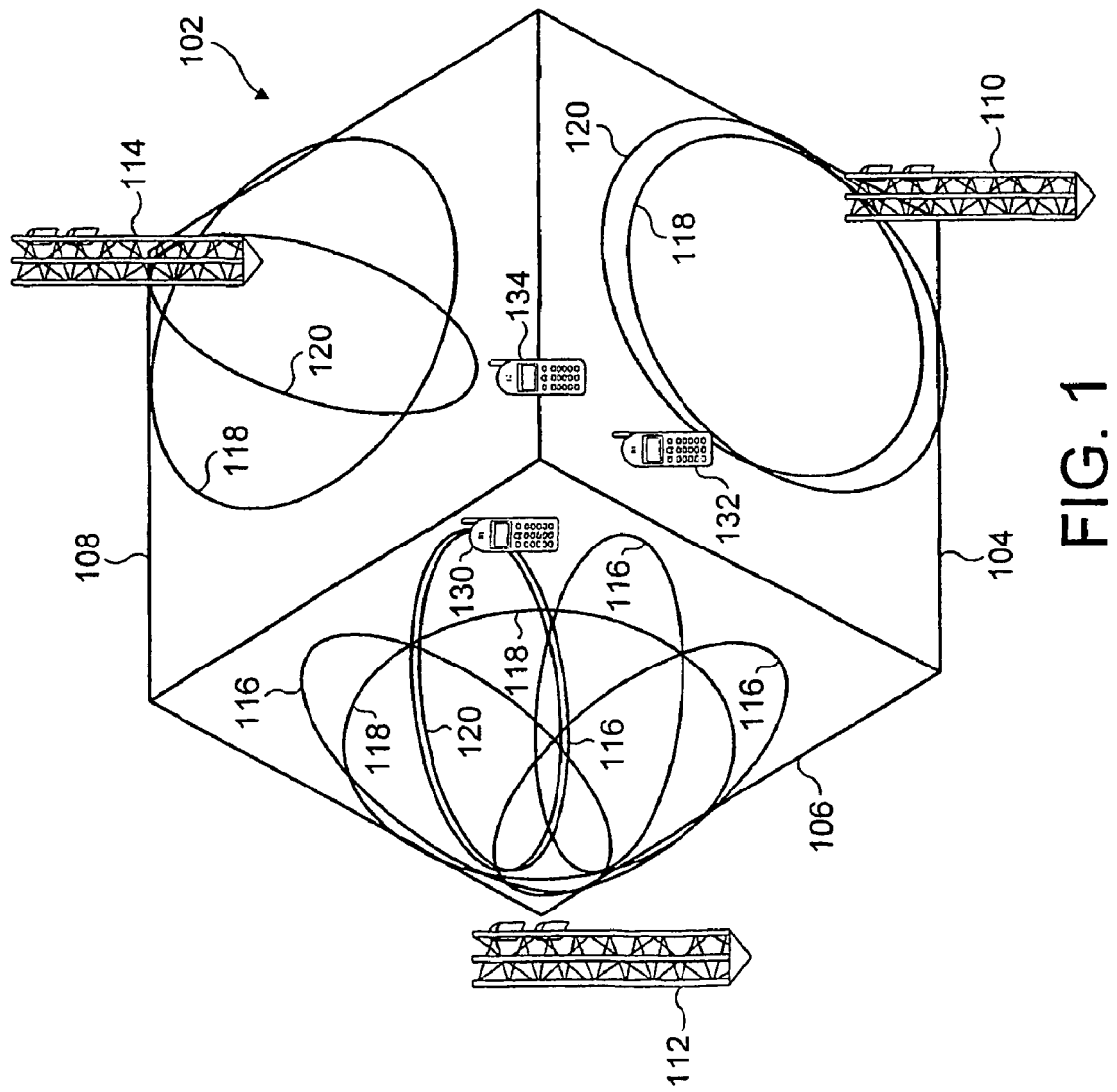
FIG. 1 illustrates exemplary W-CDMA base station cell utilising different transmission schemes in each (three-sectorized configuration)

With reference to FIG. 1, there is now described an example of multi-sector W-CDMA cells with respect to which the invention is illustrated. The invention is not, however, in any way limited to such a specific example.

A plurality of mobile stations, or user equipment roam within the cell. For example, as shown in FIG. 1, mobile station 130 is connected in cell 106, mobile station 132 is connected in cell 104, and mobile station 134 is connected in cells 104 and 108.

The base station cell 102 is divided into N sectors, where N=3 in the example of FIG. 1.

As exemplified by sector 106 of FIG. 1, each sector can be divided into either K fixed beams or steerable (user specific) beams using a base transceiver station 112. The beams 116 represent the secondary common pilot channel, the beam 120 the down-link dedicated physical channel, and the beam 118 the primary common pilot channel.

Sector 104 of FIG. 1 illustrates the traditional single antenna transmission scheme utilizing a base transceiver station 110. The beam 120 the down-link dedicated physical channel, and the beam 118 the primary common pilot channel.

Sector 108 of FIG. 1 illustrates user specific beam-forming using a base transceiver station 114. The beam 120 the down-link dedicated physical channel, and the beam 118 the primary common pilot channel.

FIG. 1 thus illustrates the CPICHs needed in the different transmission schemes, and the DL-CPCH of a single user.

For the purposes of describing the present invention, two of the three base transceiver stations of the example of FIG. 1 use adaptive antenna techniques for communicating with mobile stations in the various sectors of the cell. The two sectors utilizing adaptive antenna techniques are sectors 106 and 108. Adaptive antenna techniques are well-known in the art, and the present invention is not directly concerned with any specific implementation details of such techniques. As a skilled person will be familiar with, when using adaptive antenna techniques the base transceiver station 100 transmits mobile specific data to a mobile station through a narrow beam.

The W-CDMA specification defines three different types of pilot channels in the forward link for an adaptive antenna system. These pilot channels are:
1. P-CPICH (Primary Common Pilot Channel);
2. S-CPICH (Secondary Common Pilot Channel); and
3. Dedicated pilot symbols in DPCCH (Dedicated Physical Control Channel).

The P-CPICH is broadcast over an entire sector in a multi-sector arrangement, and there exists only one such channel for each sector. The P-CPICH is used in the hand-over measurements and cell selection/reselection procedures. Another function of the P-CPICH channel, when the common channels are not associated with dedicated channels or not involved in adaptive antenna techniques, is to aid the channel estimation at the mobile station for the dedicated channels, and to provide a channel estimation reference for the common channels.

The S-CPICH may be transmitted over the entire cell or over only part of the cell. There may be zero, one or several S-CPICHs per cell or sector. One typical area of S-CPICH usage is operations with base stations having multiple beams (fixed) per sector. The S-CPICHs are used for identifying different beams at the mobile station.

The dedicated pilot symbols are multiplexed into the down-link dedicated physical channel (DPCH). They are used in signal-to-interference ratio (SIR) estimation and are also used in the channel estimation. If the mobile station or user equipment is informed that the P-CPICH is not the phase reference and there is no S-CPICH available, then the dedicated pilot bits in the DL-DPCCH are the phase reference for the DL-DPCH. This may happen, for example, in the case of user-specific beam forming.

In accordance with the present invention, it is proposed to use the primary common pilot channel P-CPICH for estimating interference power in a mobile station or user equipment in the receiver of an adaptive antenna system.

Even though user specific beam forming is applied in adaptive antenna systems, the P-CPICH must be broadcast.

A proposed implementation of an interference power estimation technique in accordance with the present invention is provided hereinafter.

If the interference is considered as additive white Gaussian noise (AWGN) type, and the channel is maintained constant during the estimation period, the optimum choice for estimating the unknown variance is the minimum variance unbiased (MVU). Below there is presented the MVU interference estimation method in accordance with the present invention.

The received signal is denoted as X, and is defined as:

$$x(n) = A + w(n) \quad (1)$$

where A is the amplitude of signal, and w(n) is a zero-mean white noise with power $\sigma^2$. The MVU estimator for the noise power is then:

$$\hat{\sigma}^2 = E(|X - E(X)|^2) \quad (2)$$

which can be shown to reduce to:

$$\hat{\sigma}^2 = E(|X|^2) - |E(X)|^2 \quad (3)$$

The expected value of (2) is $$E(\hat{\sigma}^2) = \frac{p}{p+1}\sigma^2, \quad (4)$$

where p is the number of samples used for estimation.

The variance of (2) is:

$$\mathrm{var}(\hat{\sigma}^2) = \frac{2(p-1)\sigma^4}{p^2}. \quad (5)$$

When implementing the MVU estimator in a W-CDMA system, the idea is to calculate interference power separately for each temporal rake finger of the rake receiver (DL-DPCH figner positions). The total interference power estimate (after rake combining) is given by combining the finger-specific estimates. This can be done for example by taking an average of the finger-specific estimates (equal gain combining) or using the estimates of the dedicated channel for weighting (maximal ratio combining).

An example of a first embodiment utilizing equal gain combining is given hereinafter:

$$\hat{h}_l^{(c)} = \frac{1}{N_c}\sum_{i=1}^{N_c} r_{l,i}^{(c)} a_i^{(c)*} \quad (6)$$

$$\hat{I} = \frac{1}{L}\sum_{l=1}^{L} \frac{1}{N_c}\sum_{i=1}^{N_c} |r_{l,i}^{(c)} - \hat{h}_l^{(c)}|^2 \quad (7)$$

where:
$\hat{h}_l^{(c)}$ = Channel estimate of P-CPICH channel, l is path index
$N_c$ = Number of pilot symbols per time slot in P-CPICH channel
$a_i^{(c)}$ = Complex pilot symbol of P-CPICH channel, i is symbol index
$r_{i,l}^{(c)}$ = Received complex pilot symbol from P-CPICH channel An example of maximal ratio combining, in a second embodiment, is given hereinafter:

$$\hat{h}_l^{(d)} = \frac{1}{N_d}\sum_{i=1}^{N_d} r_{l,i}^{(d)} a_i^{(d)*} \quad (8)$$

$$\hat{I} = \sum_{l=1}^{L} \left[ |\hat{h}_l^{(d)}|^2 \frac{1}{N_c}\sum_{i=1}^{N_c} |r_{l,i}^{(c)} - \hat{h}_l^{(c)}|^2 \right] \quad (9)$$

Where:
$\hat{h}_l^{(d)}$ = Channel estimate of DL-DPCCH channel, l is path index
$N_d$ = Number of dedicated pilot symbols in timeslot
$a_i^{(d)}$ = Dedicated complex pilot symbol, i is symbol index
$r_{i,l}^{(d)}$ = Received complex pilot symbol from dedicated channel Referring to FIG. 2, there is illustrated a block diagram of the main elements of a receiver suitable for implementing the present invention in an exemplary W-CDMA system.

Figure 2:
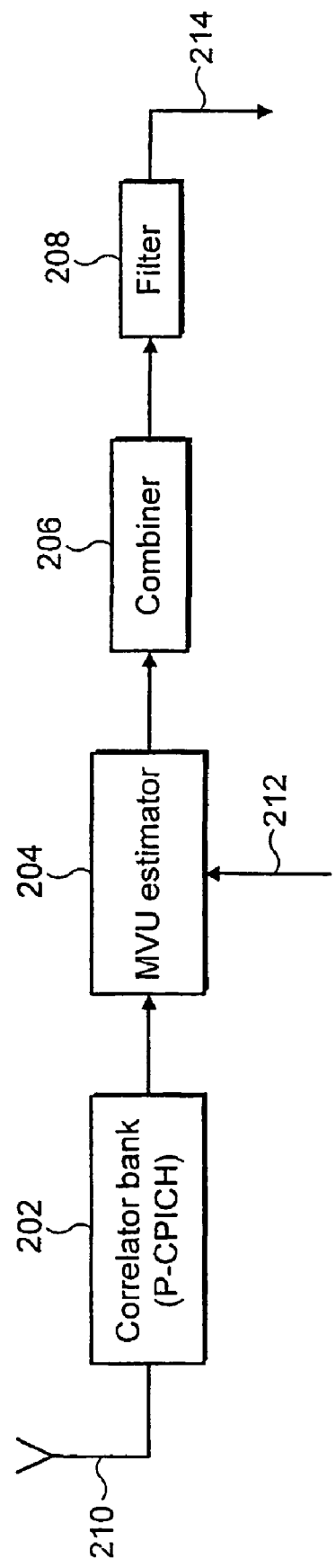
FIG. 2 illustrates in block diagram form elements of a receiver necessary for implementing the present invention.

Referring to FIG. 2 there is provided a correlator bank 202, an MVU estimator 204, a combiner 206 and a filter 208.

The correlator bank 202 acts as an input means to the receiver for the primary common pilot channel received by the antenna on line 210. The correlator bank 202 provides an output to the MVU estimator 204. The MVU estimator also receives on line 212 the delay positions of the DL-DPCH rake fingers (i.e. the finger allocation of the DL-DPCH). The output of the MVU estimator provides an input to the combiner 206. The output of the combiner 206 is optionally filtered by filter 208. The output of the filter 208 provides the narrowband interference power estimate for the ith time slot.

A link level simulation has been performed to study the performance of interference power estimation in the case of user specific beam-forming. The main simulation and radio environment related parameters are listed in Table I below. It is assumed that the beam signal (DL-DPCH) is transmitted by using a uniform linear antenna array having 8 antenna elements. The P-CPICH is transmitted by using the first element of the antenna array.

TABLE I

| Interference power estimation methods to be compared | 1. MVU-estimator based on DL-DPCCH<br>2. MVU-estimator based on P-CPICH |
| --- | --- |

TABLE I-continued

| | |
|---|---|
| Channel profile | 2-path Rayleigh |
| Speed of mobile | 3 km/h |
| Geometry value | 9.0 dB |
| Interelement spacing of antenna array | λ/2 |
| Mean angle of arrival | 0 degrees |
| Angular spread | 60 degrees |
| Spreading factor of DL-DPCH | 128 |
| # of DL-DPCCH symbols | 4 |
| Spreading factor of P-CPICH | 256 |
| # of P-CPICH symbols | 10 |
| Power of P-CPICH | −10 dB |
| Operation point | Uncoded BER of 0.18 |
| Power control | OFF |

Comparison of DL-DPCCH and P-CPIHC based interference power estimator (MVU) in the case of user specific beamforming (in slot by slot basis).

Figure 3:
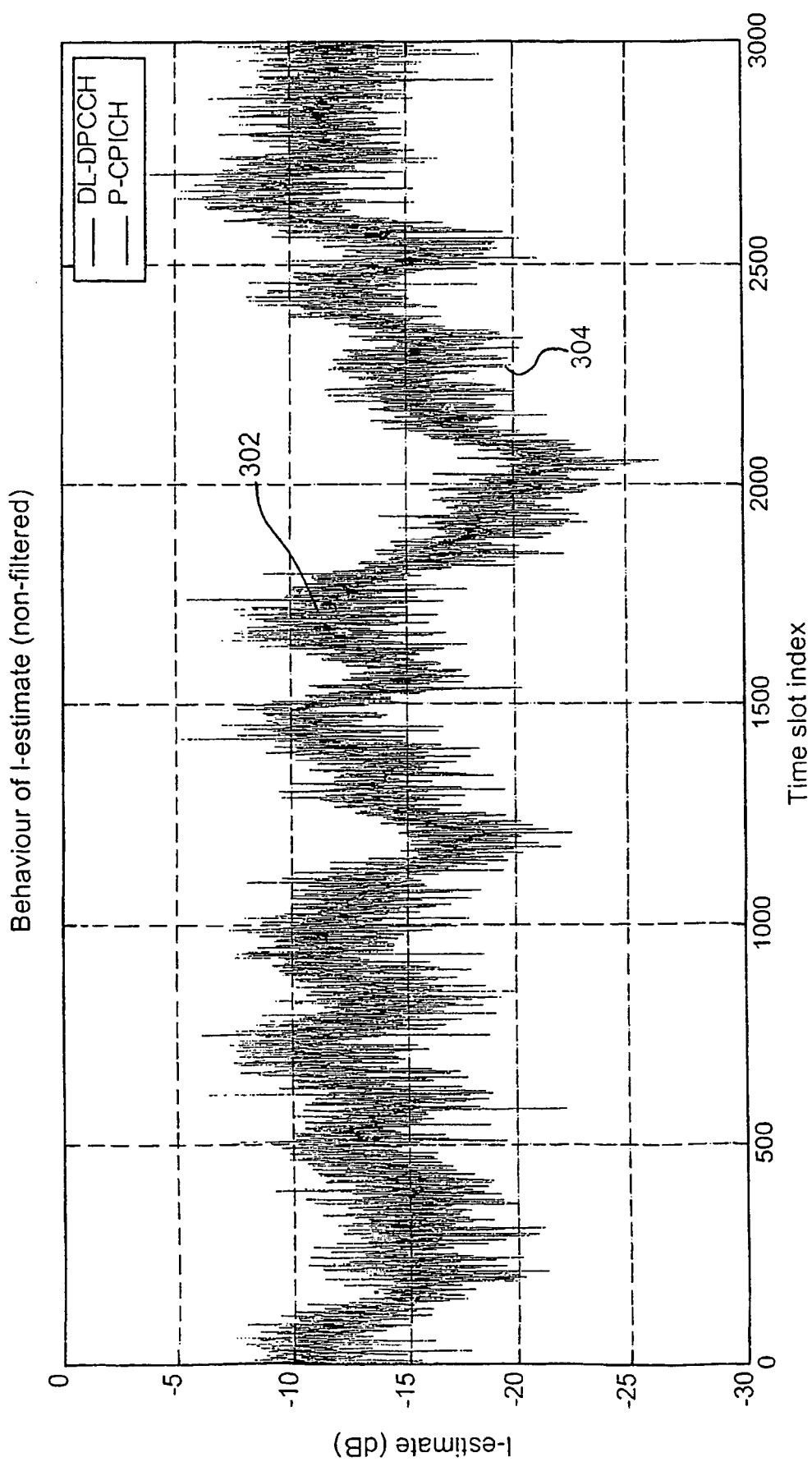
FIG. 3 illustrates simulation results comparing the technique of the prior art of that of the present invention.

The simulation results are shown in FIG. 3. FIG. 3 shows that the P-CPICH can be used in the interference power estimation of the DL-DPCH even when the angular spread is large (i.e. the antenna signal and beam signals are almost uncorrelated). It can be seen that interference power estimate obtained from P-CPICH, the central thick line in FIG. 3, follow the changes in the orthogonal interference of DL-DPCH. FIG. 2 also show that that the variance of the I-estimate obtained from the P-CPICH is much smaller than in the case that it is estimated from DL-DPCCH, which is illustrated by the light peripheral lines in FIG. 3. This is due to two reasons:

1. In the P-CPICH channel there are more samples (de-spread symbols) to calculate the MVU estimate (see equation 5).
2. In the P-CPICH channel the noise variance that to be estimated is lower than in DPCCH channel due to higher spreading factor (see equation 5).

Thus the present invention provides a technique in which in a preferred embodiment the primary common pilot channel is used in the interference power estimation, which is part of the SIR estimation, of the down-link physical channel. This technique can be used in antenna arrangements where beamforming is utilized, regardless of the correlation between the P-CPICH and the DL-DPCH. The performance of the proposed interference power estimator is not dependent on the transmit power of the P-CPICH channel.

The P-CPICH based interference power estimation method presented herein can estimate the orthogonal interference of DL-DPCCH even though the two channels were completely uncorrelated. The only restriction for the P-CPICH based interference power estimation described herein is that the delay positions of the temporal rake fingers have to be the same in both P-CPICH (antenna signal) and DL-DPCCH (beam signal).

The invention claimed is:

1. An apparatus, comprising:
a rake receiver of a communication system having an adaptive antenna transmitter, the receiver comprising
first input means for receiving a beam signal,
second input means for receiving an antenna signal, and
estimating means, operatively connected to the second input means, for estimating the interference power of the received beam signal for each rake finger of the rake receiver and for averaging the interference power for said rake fingers, wherein said estimating means utilises channel estimates of said antenna signal to estimate said interference power.

2. A method, comprising:
receiving, by a rake receiver of a communication system having an adaptive antenna transmitter, a beam signal;
receiving, by the rake receiver, an antenna signal; and
estimating, by the rake receiver, an interference power of the received beam signal for each rake finger of the rake receiver, and averaging interference power for said rake fingers, wherein estimating of said interference power of the received beam signal utilises channel estimates of said antenna signal.

3. The method according to claim 2, wherein the antenna signal comprises a common pilot channel, and wherein the estimating of interference power is based on channel estimates of signals received in the common pilot.

4. The method according to claim 2, wherein the estimating is performed at the rake receiver of a cellular communication system, said cellular communication system comprising a plurality of cells, each cell comprising at least one sector.

5. The method according to claim 4, wherein the antenna signal is transmitted over an entire sector and the beam signal is transmitted over a part of a sector.

6. The method according to claim 2, wherein the estimating is performed at the rake receiver of a wideband code division multiple access system.

7. The method according to claim 6, wherein the antenna signal comprises a primary common pilot channel.

8. The method according to claim 6, wherein the beam signal comprises a secondary common pilot channel.

9. The method according to claim 6, wherein the beam signal comprises a dedicated physical channel.

10. The method according to claim 2, wherein the interference power is estimated using:

$$\hat{h}_l^{(c)} = \frac{1}{N_c} \sum_{i=1}^{N_c} r_{l,i}^{(c)} a_i^{(c)*}$$

$$\hat{I} = \frac{1}{L} \sum_{l=1}^{L} \frac{1}{N_c} \sum_{i=1}^{N_c} \left| r_{l,i}^{(c)} - \hat{h}^{(c)} \right|^2$$

where:
$\hat{h}_l^{(c)}$=Channel estimate of a primary common pilot channel, l is path index
$N_c$=Number of pilot symbols per time slot in the primary common pilot channel
$a_i^{(c)}$=Complex pilot symbol of the primary common pilot channel, i is symbol index
$r_{i,l}^{(c)}$=Received complex pilot symbol from the primary common pilot channel
L=Number of Paths.

11. The method as claimed in claim 2, wherein the estimating of interference power comprises using equal gain combining of said interference power for each rake finger.

12. An apparatus, comprising:
a rake receiver of a communication system having an adaptive antenna transmitter, the receiver comprising
a first input unit configured to receive a beam signal,
a second input unit configured to receive an antenna signal, and
an estimating unit, operatively connected to the second input unit, configured to estimate the interference power of the received beam signal for each rake finger of the rake receiver and to average the interference power for said rake fingers, wherein estimating of said interference power of the received beam signal utilises channel estimates of said antenna signal.

13. The apparatus according to claim 12, wherein the antenna signal comprises a common pilot channel.

14. The apparatus according to claim 12, wherein the beam signal comprises a dedicated channel.

15. The apparatus according to claim 12, wherein the apparatus is a part of the communication system, and
wherein the communications system is a cellular communication system and said cellular communication system comprising a plurality of cells, each cell comprising at least one sector.

16. The apparatus according to claim 15, wherein the antenna signal is transmitted over an entire sector and the beam signal is transmitted over a part of a sector.

17. The apparatus according to claim 12, wherein the apparatus is part of a wideband code division multiple access system.

18. The apparatus according to claim 17, wherein the antenna signal comprises a primary common pilot channel.

19. The apparatus according to claim 18, wherein the estimation of the interference power utilises pilot signals transmitted in the primary common pilot channel.

20. The apparatus according to claim 17, wherein the beam signal comprises a secondary common pilot channel.

21. The apparatus according to claim 20 wherein the estimating unit is configured to utilize pilot signals transmitted in the secondary common pilot channel.

22. The apparatus, according to claim 17, wherein the beam signal comprises a dedicated physical channel.

23. The apparatus according to claim 12, wherein the apparatus is part of a wideband code division multiple access system comprising at least one mobile station.

24. The apparatus as claimed in claim 12, wherein said estimating unit is configured to use equal gain combining of said interference power for each rake finger.

25. An apparatus, comprising:
a rake receiver of a communication system having an adaptive antenna transmitter, the receiver comprising
at least one rake finger configured to receive a beam signal, and
a processor configured to receive an antenna signal,
wherein the processor is configured to estimate the interference power of the received beam signal for each rake finger of the rake receiver and to average the interference power for said rake fingers, wherein estimating of said interference power of the received beam signal utilises channel estimates of said antenna signal.

26. The apparatus according to claim 25 wherein the processor is configured to utilize pilot signals transmitted in a secondary common pilot channel.

27. The apparatus as claimed in claim 25, wherein said processor is configured to use equal gain combining of said interference power for each rake finger.

* * * * *